(12) United States Patent
Sheridan et al.

(10) Patent No.: US 11,885,252 B2
(45) Date of Patent: *Jan. 30, 2024

(54) PLANETARY GEAR SYSTEM ARRANGEMENT WITH AUXILIARY OIL SYSTEM

(71) Applicant: RTX CORPORATION, Farmington, CT (US)

(72) Inventors: William G. Sheridan, Southington, CT (US); Michael E. McCune, Colchester, CT (US); Lawrence E. Portlock, Bethany, CT (US)

(73) Assignee: RTX Corporation, Farmington, CT (US)

( * ) Notice: Subject to any disclaimer, the term of this patent is extended or adjusted under 35 U.S.C. 154(b) by 325 days.

This patent is subject to a terminal disclaimer.

(21) Appl. No.: 16/006,327

(22) Filed: Jun. 12, 2018

(65) Prior Publication Data
US 2018/0347428 A1 Dec. 6, 2018
US 2021/0180492 A9 Jun. 17, 2021

Related U.S. Application Data

(60) Continuation of application No. 15/621,406, filed on Jun. 13, 2017, now Pat. No. 10,648,383, which is a
(Continued)

(51) Int. Cl.
*F01D 25/16* (2006.01)
*F01N 3/20* (2006.01)
(Continued)

(52) U.S. Cl.
CPC ............. *F01N 3/208* (2013.01); *F01D 25/16* (2013.01); *F01D 25/18* (2013.01); *F01N 3/2066* (2013.01);
(Continued)

(58) Field of Classification Search
CPC ...... F02C 3/10; F02C 7/06; F02C 7/36; F01D 25/16; F01D 25/18; F02K 3/06
See application file for complete search history.

(56) References Cited

U.S. PATENT DOCUMENTS 2,258,792 A 10/1941 New
2,327,859 A 8/1943 Jacques et al.
(Continued)

FOREIGN PATENT DOCUMENTS

CN 101915297 12/2010

OTHER PUBLICATIONS

2003 NASA seal/secondary air system workshop. (2003). NASA/CP-2004-212963/vol. 1. Sep. 1, 2004. pp. 1-408.
(Continued)

*Primary Examiner* — Arun Goyal
(74) *Attorney, Agent, or Firm* — Carlson, Gaskey & Olds, P.C.

(57) ABSTRACT

In an embodiment of the present disclosure, a gas turbine engine includes a fan, a first compressor stage and a second compressor stage, a first turbine stage and a second turbine stage, and wherein said first turbine stage drives said second compressor stage as a high spool, and wherein said second turbine stage drives said first compressor stage as part of a low spool, and a gear train driving said fan with said low spool, and such that said fan and said first compressor stage rotate in the same direction, and wherein said high spool operates at higher pressures than said low spool.

24 Claims, 6 Drawing Sheets

Related U.S. Application Data division of application No. 14/474,869, filed on Sep. 2, 2014, now Pat. No. 9,677,420, which is a division of application No. 14/266,888, filed on May 1, 2014, now Pat. No. 8,931,285, which is a continuation of application No. 13/428,491, filed on Mar. 23, 2012, now Pat. No. 9,995,174, which is a continuation-in-part of application No. 12/902,525, filed on Oct. 12, 2010, now Pat. No. 8,813,469, application No. 16/006,327 is a continuation of application No. 13/428,491.

(51) Int. Cl.
| | |
|---|---|
| F01D 25/18 | (2006.01) |
| F02C 3/10 | (2006.01) |
| F02K 3/06 | (2006.01) |
| F02C 7/36 | (2006.01) |
| F02C 7/06 | (2006.01) |
| F02C 7/10 | (2006.01) |
| F01N 11/00 | (2006.01) |
| F16N 7/34 | (2006.01) |

(52) U.S. Cl.
CPC ............... *F01N 11/00* (2013.01); *F02C 3/10* (2013.01); *F02C 7/06* (2013.01); *F02C 7/10* (2013.01); *F02C 7/36* (2013.01); *F02K 3/06* (2013.01); *F01N 2610/01* (2013.01); *F01N 2610/02* (2013.01); *F01N 2610/142* (2013.01); *F01N 2610/1406* (2013.01); *F01N 2610/148* (2013.01); *F01N 2900/1814* (2013.01); *F05D 2260/40311* (2013.01); *F16N 7/34* (2013.01); *Y02T 10/12* (2013.01); *Y02T 50/60* (2013.01); *Y10T 29/4932* (2015.01); *Y10T 137/0324* (2015.04); *Y10T 137/7297* (2015.04)

(56) References Cited

U.S. PATENT DOCUMENTS

| | | |
|---|---|---|
| 2,591,743 A | 4/1952 | Thompson |
| 2,684,591 A | 7/1954 | Lundquist |
| 2,703,021 A | 3/1955 | Stoeckicht |
| 2,749,778 A | 6/1956 | Otto et al. |
| 2,830,473 A | 4/1958 | Brown |
| 2,883,885 A | 4/1959 | Frank et al. |
| 2,936,655 A | 5/1960 | Peterson et al. |
| 2,968,922 A | 1/1961 | Gilbert |
| 3,021,731 A | 2/1962 | Stoeckicht |
| 3,160,026 A | 12/1964 | William et al. |
| 3,194,487 A | 7/1965 | Tyler et al. |
| 3,287,906 A | 11/1966 | McCormick |
| 3,307,433 A | 3/1967 | Bennett et al. |
| 3,352,178 A | 11/1967 | Lindgren et al. |
| 3,412,560 A | 11/1968 | Gaubatz |
| 3,459,072 A | 8/1969 | Shannon et al. |
| 3,650,353 A | 3/1972 | Abbott |
| 3,664,612 A | 5/1972 | Skidmore et al. |
| 3,747,343 A | 7/1973 | Rosen |
| 3,754,484 A | 8/1973 | Roberts |
| 3,765,623 A | 10/1973 | Donelson et al. |
| 3,776,067 A | 12/1973 | DeBruyne et al. |
| 3,820,719 A | 6/1974 | Clark et al. |
| 3,843,277 A | 10/1974 | Ehrich |
| 3,892,358 A | 7/1975 | Gisslen |
| 3,932,058 A | 1/1976 | Harner et al. |
| 3,935,558 A | 1/1976 | Miller et al. |
| 3,960,029 A | 6/1976 | Eichinger |
| 3,988,889 A | 11/1976 | Chamay et al. |
| 4,050,544 A | 9/1977 | Kalyan et al. |
| 4,130,872 A | 12/1978 | Haloff |
| 4,220,171 A | 9/1980 | Ruehr et al. |
| 4,227,427 A | 10/1980 | Dick |
| 4,240,250 A | 12/1980 | Harris |
| 4,271,928 A | 6/1981 | Northern |
| 4,284,174 A | 8/1981 | Salvana et al. |
| 4,289,360 A | 9/1981 | Zirin |
| 4,378,711 A | 4/1983 | Daniel |
| 4,438,663 A | 3/1984 | Eichenberger et al. |
| 4,455,888 A | 6/1984 | Wayman et al. |
| 4,467,670 A | 8/1984 | Kawamoto |
| 4,478,551 A | 10/1984 | Honeycutt, Jr. et al. |
| 4,528,870 A | 7/1985 | Van Deursen et al. |
| 4,583,413 A | 4/1986 | Lack |
| 4,649,114 A | 3/1987 | Miltenburger et al. |
| 4,657,410 A | 4/1987 | Hibner |
| 4,696,156 A | 9/1987 | Burr et al. |
| 4,722,357 A | 2/1988 | Wynosky |
| 4,784,018 A | 11/1988 | Okada et al. |
| 4,950,213 A | 8/1990 | Morisawa |
| 4,979,362 A | 12/1990 | Vershure, Jr. |
| 5,058,452 A | 10/1991 | El-Shafei |
| 5,058,617 A | 10/1991 | Stockman et al. |
| 5,102,379 A | 4/1992 | Pagluica et al. |
| 5,141,400 A | 8/1992 | Murphy et al. |
| 5,317,877 A | 6/1994 | Stuart |
| 5,361,580 A | 11/1994 | Ciokajlo et al. |
| 5,433,674 A | 7/1995 | Sheridan et al. |
| 5,447,411 A | 9/1995 | Curley et al. |
| 5,466,198 A | 11/1995 | McKibbin et al. |
| 5,472,059 A | 12/1995 | Schlosser et al. |
| 5,472,383 A * | 12/1995 | McKibbin ............ F16H 57/0482 184/6.12 |
| 5,524,847 A | 6/1996 | Brodell et al. |
| 5,634,767 A | 6/1997 | Dawson |
| 5,643,126 A | 7/1997 | Hotta et al. |
| 5,677,060 A | 10/1997 | Terentieva et al. |
| 5,685,797 A | 11/1997 | Barnsby et al. |
| 5,778,659 A | 7/1998 | Duesler et al. |
| 5,830,098 A | 11/1998 | Kimes |
| 5,857,836 A | 1/1999 | Stickler et al. |
| 5,915,917 A | 6/1999 | Eveker et al. |
| 5,975,841 A | 11/1999 | Lindemuth et al. |
| 5,985,470 A | 11/1999 | Spitsberg et al. |
| 6,223,616 B1 * | 5/2001 | Sheridan ............... F16H 1/2827 184/6.12 |
| 6,315,815 B1 | 11/2001 | Spadaccini et al. |
| 6,318,070 B1 | 11/2001 | Rey et al. |
| 6,387,456 B1 | 5/2002 | Eaton, Jr. et al. |
| 6,517,341 B1 | 2/2003 | Brun et al. |
| 6,607,165 B1 | 8/2003 | Manteiga et al. |
| 6,709,492 B1 | 3/2004 | Spadaccini et al. |
| 6,814,541 B2 | 11/2004 | Evans et al. |
| 6,883,303 B1 | 4/2005 | Seda |
| 7,021,042 B2 | 4/2006 | Law |
| 7,219,490 B2 | 5/2007 | Dev |
| 7,328,580 B2 | 2/2008 | Lee et al. |
| 7,374,403 B2 | 5/2008 | Decker et al. |
| 7,591,754 B2 | 9/2009 | Duong et al. |
| 7,632,064 B2 | 12/2009 | Somanath et al. |
| 7,662,059 B2 | 2/2010 | McCune |
| 7,704,178 B2 | 4/2010 | Sheridan et al. |
| 7,806,651 B2 | 10/2010 | Kennepohl et al. |
| 7,824,305 B2 | 11/2010 | Duong et al. |
| 7,828,682 B2 | 11/2010 | Smook |
| 7,926,260 B2 | 4/2011 | Sheridan et al. |
| 7,997,868 B1 | 8/2011 | Liang |
| 8,205,432 B2 * | 6/2012 | Sheridan ............... F02C 7/36 60/226.1 |
| 8,484,942 B1 | 7/2013 | McCune et al. |
| 8,813,469 B2 | 8/2014 | Sheridan |
| 8,931,285 B2 | 1/2015 | McCune et al. |
| 2006/0228206 A1 | 10/2006 | Decker et al. |
| 2007/0084187 A1 | 4/2007 | Moniz et al. |
| 2007/0240399 A1 | 10/2007 | Orlando et al. |
| 2008/0003096 A1 | 1/2008 | Kohli et al. |
| 2008/0044276 A1 | 2/2008 | McCune et al. |
| 2008/0116009 A1 | 5/2008 | Sheridan et al. |
| 2008/0317588 A1 | 12/2008 | Grabowski et al. |
| 2009/0056343 A1 | 3/2009 | Suciu et al. |
| 2009/0090096 A1 | 4/2009 | Sheridan |
| 2009/0188334 A1 | 7/2009 | Merry et al. |

(56) References Cited

U.S. PATENT DOCUMENTS

| | | | |
|---|---|---|---|
| 2009/0304518 A1 | 12/2009 | Kodama et al. | |
| 2009/0314881 A1 | 12/2009 | Suciu et al. | |
| 2010/0105516 A1 | 4/2010 | Sheridan et al. | |
| 2010/0148396 A1 | 6/2010 | Xie et al. | |
| 2010/0154217 A1 | 6/2010 | Sheridan et al. | |
| 2010/0160105 A1 | 6/2010 | Sheridan et al. | |
| 2010/0212281 A1* | 8/2010 | Sheridan | F02C 7/36 60/39.08 |
| 2010/0218483 A1 | 9/2010 | Smith | |
| 2010/0317477 A1 | 12/2010 | Sheridan et al. | |
| 2010/0317478 A1 | 12/2010 | McCune et al. | |
| 2010/0331139 A1 | 12/2010 | McCune | |
| 2011/0130246 A1 | 6/2011 | McCune et al. | |
| 2011/0159797 A1 | 6/2011 | Beltman et al. | |
| 2011/0293423 A1 | 12/2011 | Bunker et al. | |
| 2012/0124964 A1 | 5/2012 | Hasel et al. | |

OTHER PUBLICATIONS

Berton, J.J. and Guynn, M.D. (2012). Multi-objective optimization of a turbofan for an advanced, single-aisle transport. NASA/TM-2012-217428. pp. 1-26.
Chapman, J.W. and Litt, J.S. (2017). Control design for an advanced geared turbofan engine. AIAA Joint Propulsion Conference 2017. Jul. 10, 2017-Jul. 12, 2017. Atlanta, GA. pp. 1-12.
Dalton, III., W.N. (2003). Ultra high bypass ratio low noise engine study. NASA/CR-2003-212523. Nov. 2003 pp. 1-187.
Edkins, D.P., Hirschkron, R., and Lee, R. (1972). TF34 turbofan quiet engine study. Final Report prepared for NASA. NASA-CR-120914. Jan. 1, 1972. pp. 1-99.
Fisher, K., Berton, J., Guynn, M., Haller B., Thurman, D., and Tong, M. (2012). NASA's turbofan engine concept study for a next-generation single-aisle transport. Presentation to ICAO's noise technology independent expert panel. Jan. 25, 2012. pp. 1-23.
Greitzer, E.M., Bonnefoy, P.A., Delaroseblanco,E., Dorbian, C.S., Drela, M., Hall, D.K., Hansman, R.J., Hileman, J.I., Liebeck, R.H., Levegren, J. (2010). N+3 aircraft concept designs and trade studies, final report. vol. 1. Dec. 1, 2010. NASA/CR-2010-216794/vol. 1. pp. 1-187.
Guynn, M.D., Berton, J.J., Fisher, K.L., Haller, W.J., Tong, M.T., and Thurman, D.R. (2009). Engine concept study for an advanced single-aisle transport. NASA/TM-2009-215784. pp. 1-97.
Guynn, M.D., Berton, J.J., Fisher, K.L., Haller, W.J., Tong, M. T., and Thurman, D.R. (2009). Analysis of turbofan design options for an advanced single-aisle transport aircraft. American Institute of Aeronautics and Astronautics. pp. 1-13.
Mavris, D.N., Schutte, J.S. (2016). Application of deterministic and probabilistic system design methods and enhancements of conceptual design tools for ERA project final report. NASA/CR-2016-219201. May 1, 2016. pp. 1-240.
Mccracken, R.C. (1979). Quiet short-haul research aircraft familiarization document. NASA-TM-81149. Nov. 1, 1979. pp. 1-76.
Litt, J.S. (2018). Sixth NASA Glenn Research Center propulsion control and diagnostics (PCD) workshop. Nasa/CP-2018-219891. Apr. 1, 2018. pp. 1-403.
Rotordynamic instability problems in high-performance turbomachinery. (1986). NASA conference publication 2443. Jun. 2-4, 1986.
Sargisson, D.F. (1985). Advanced propfan engine technology (APET) and single-rotation gearbox/pitch change mechanism. NASA Contractor Report—168113. R83AEB592. Jun. 1, 1985. pp. 1-476.
Singh, R. and Houser, D.R. (1990). Non-linear dynamic analysis of geared systems. NASA-CR-180495. Feb. 1, 1990. pp. 1-263.
Smith, C.E., Hirschkron, R., and Warren, R.E. (1981). Propulsion system study for small transport aircraft technology (STAT). Final report. NASA-CR-165330. May 1, 1981. pp. 1-216.
Tong, M.T., Jones, S.M., Haller, W.J., and Handschuh, R.F. (2009). Engine conceptual design studies for a hybrid wing body aircraft. NASA/TM-2009-215680. Nov. 1, 2009. pp. 1-15.

Bloomer, H.E., Loeffler, I.J., Kreim, W.J., and Coats, J.W. (1981). Comparison of NASA and contractor reslts from aeroacoustic tests of QCSEE OTW engine. NASA Technical Memorandum 81761. Apr. 1, 1981. pp. 1-30.
Bloomer, H.E. and Samanich, N.E. (1982). QCSEE under-the-wing engine acoustic data. NASA-TM-82691. May 1, 1982. pp. 1-28.
Bloomer, H.E. and Loeffler, I.J. (1982). QCSEE over-the-wing engine acoustic data. NASA-TM-82708. May 1, 1982. pp. 1-558.
Bloomer, H.E. and Samanich, N.E. (1982). QCSEE under-the-wing enging-wing-flap aerodynamic profile characteristics. NASA-TM-82890. Sep. 1, 1982. pp. 1-48.
Howard, D.F. (1976). QCSEE preliminary under the wing flight propulsion system analysis report. NASA CR-134868. Feb. 1, 1976. pp. 1-260.
Misel, O.W. (1977). QCSEE main reduction gears test program. NASA CR-134669. Mar. 1, 1977. pp. 1-222.
QCSEE Preliminary analyses and design report. vol. 1. (1974). NASA-CR-134838. Oct. 1, 1974. pp. 1-337.
QCSEE preliminary analyses and design report. vol. II. (1974). NASA-CR-134839. Oct. 1, 1974. pp. 340-630.
QCSEE under-the-wing engine composite fan blade design. (1975). NASA-CR-134840. May 1, 1975. pp. 1-51.
QCSEE the aerodynamic and preliminary mechanical design of the QCSEE OTW fan. (1975). NASA-CR-134841. Feb. 1, 1975. pp. 1-74.
QCSEE under-the-wing engine composite fan blade preliminary design test report. (1975). NASA-CR-134846. Sep. 1, 1975. pp. 1-56.
QCSEE over-the-wing final design report. (1977). NASA-CR-134848. Jun. 1, 1977. pp. 1-503.
QCSEE hamilton standard cam/harmonic drive variable pitch fan actuation system derail design report. (1976). NASA-CR-134852. Mar. 1, 1976. pp. 1-172.
QCSEE main reduction gears bearing development program final report. (1975). NASA-CR-134890. Dec. 1, 1975. pp. 1-41.
QCSEE under-the-wing engine digital control system design report. (1978). NASA-CR-134920. Jan. 1, 1978. pp. 1-309.
QCSEE the aerodynamic and mechanical design of the QCSEE under-the-wing fan. (1977). NASA-CR-135009. Mar. 1, 1977. pp. 1-137.
OCSEE under-the-wing engine composite fan blade final design test report. (1977). NASA-CR-135046. Feb. 1, 1977. pp. 1-55.
QCSEE over-the-wing propulsion system test report vol. III—mechanical performance. (1978). NASA-CR-135325. Feb. 1, 1978. pp. 1-112.
QCSEE ball spline pitch-change mechanism whirligig test report. (1978). NASA-CR-135354. Sep. 1, 1978. pp. 1-57.
Quiet clean general aviation turbofan (QCGAT) technology study final report vol. I. (1975). NASA-CR-164222. Dec. 1, 1975. pp. 1-186.
Neitzel, R.E., Hirschkron, R. and Johnston, R.P. (1976). Study of unconventional aircraft engines designed for low energy consumption. NASA-CR-135136. Dec. 1, 1976. pp. 1-153.
Neitzel, R., Lee, R., and Chamay, A.J. (1973). Engine and installation preliminary design. Jun. 1, 1973. pp. 1-333.
Parametric study of STOL short-haul transport engine cycles and operational techniques to minimize community noise impact. NASA-CR-114759. Jun. 1, 1974. pp. 1-398.
Sowers, H.D. and Coward, W.E. (1978). QCSEE over-the-wing (OTW) engine acuostic design. NASA-CR-135268. Jun. 1, 1978. pp. 1-52.
Schaefer, J.W., Sagerser, D.R., and Stakolich, E.G. (1977). Dynamics of high-bypass-engine thrust reversal using a variable-pitch fan. Technical Report prepared for NASA. NASA-TM-X-3524. May 1, 1977. pp. 1-33.
Johnston, R.P., Hirschkron, R., Koch, C.C., Neitzel, R.E., and Vinson, P.W. (1978). Energy efficient engine: Preliminary design and integration study—final report. NASA CR-135444. Sep. 1978. pp. 1-401.
Johnston, R.P. and Hemsworth, M.C. (1978). Energy efficient engine preliminary design and integration studies. Jun. 1, 1978. pp. 1-28.

(56) References Cited

OTHER PUBLICATIONS

Awker, R.W. (1986). Evaluation of propfan propulsion applied to general aviation. NASA CR-175020. Mar. 1, 1986. pp. 1-140.

Howe, D.C. and Wynosky, T.A. (1985). Energy efficient engine program advanced turbofan nacelle definition study. NASA CR-174942. May 1, 1985. pp. 174.

Singh, B. (1986). Small engine component technology (SECT) study. NASA CR-175079. Mar. 1, 1986. pp. 1-102.

Liebeck, R.H., Andrastek, D.A., Chau, J., Girvin, R., Lyon, R., Rawdon, B.K., Scott, P.W et al. (1995). Advanced subsonic airplane design & economics studies. NASA CR-195443. Apr. 1995. pp. 1-187.

Anderson, R.D. (1985). Advanced Propfan Engine Technology (APET) definition study, single and counter-rotation gearbox/pitch change mechanism design. NASA CR-168115. Jul. 1, 1985. pp. 1-289.

Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. Mar. 1, 2986. pp. 1-101.

Gliebe, P.R., Ho, P.Y., and Mani, R. (1995). UHB engine fan and broadband noise reduction study. NASA CR-198357. Jun. 1995. pp. 1-48.

Holcombe, V. (2003). Aero-Propulsion Technology (APT) task V low noise ADP engine definition study. NASA CR-2003-212521. Oct. 1, 2003. pp. 1-73.

Sutliff, D. (2005). Rotating rake turbofan duct mode measurement system. NASA TM-2005-213828. Oct. 1, 2005. pp. 1-34.

Adamson, A.P. (1975). Quiet Clean Short-Haul Experimental Engine (QCSEE) design rationale. Society of Automotive Engineers. Air Transportation Meeting. Hartford, CT. May 6-8, 1975. pp. 1-9.

NASA Conference Publication. (1978). CTOL transport technology. NASA-CP-2036-PT-1. Jun. 1, 1978. pp. 1-531.

Gray, D.E. (1978). Energy efficient engine preliminary design and integration studies. NASA-CP-2036-PT-1. Nov. 1978. pp. 89-110.

Kandebo, S.W. (1993). Pratt & Whitney launches geared turbofan engine. Aviation Week & Space Technology, 148(8). p. 32-4.

Kandebo, S.W. (1993). Geared-Turbofan engine design targets cost, complexity. Aviation Week & Space Technology, 148(8). p. 34-5.

Davis, D.G.M. (1973). Variable-pitch fans: Progress in Britain. Flight International. Apr. 19, 1973. pp. 615-617.

Levintan, R.M. (1975). Q-Fan demonstrator engine. Journal of Aircraft. vol 12( 8). Aug. 1975. pp. 658-663.

Aerospace Information Report. (2008). Advanced ducted propulsor in-flight thrust determination. SAE International AIR5450. Aug. 2008. p. 1-392.

Technical Report. (1975). Quiet Clean Short-haul Experimental Engine (QCSEE) UTW fan preliminary design. NASA-CR-134842. Feb. 1, 1975. pp. 1-98.

Daggett, D.L., Brown, S.T., and Kawai, R.T. (2003). Ultra-efficient engine diameter study. NASA/CR-2003-212309. May 2003. pp. 1-52.

Technical Report. (1975). Quiet Clean Short-haul Experimental Engine (QCSEE) Under-the-Wing (UTW) final design report. NASA-CR-134847. Jun. 1, 1977. pp. 1-697.

\* cited by examiner

PLANETARY GEAR SYSTEM ARRANGEMENT WITH AUXILIARY OIL SYSTEM

This application is a continuation of U.S. Ser. No. 13/428, 491, filed Mar. 23, 2012, which is a continuation-in-part application of U.S. Ser. No. 12/902,525, filed Oct. 12, 2010, which is now U.S. Pat. No. 8,813,469 granted Aug. 26, 2014. This application is also a continuation of U.S. Ser. No. 15/621,406, filed Jun. 13, 2017, which is a divisional of U.S. Ser. No. 14/474,869, filed Sep. 2, 2014, which is a divisional of U.S. Ser. No. 14/266,888, filed May 1, 2014, which is now U.S. Pat. No. 8,931,285 granted Jan. 13, 2015, which is a continuation of U.S. Ser. No. 13/428,491, filed Mar. 23, 2012, which is a continuation-in-part application of U.S. Ser. No. 12/902,525, filed Oct. 12, 2010, which is now U.S. Pat. No. 8,813,469 granted Aug. 26, 2014.

FIELD

This invention relates to planetary gear trains and more particularly to a lubricating system for a planetary gear train.

BACKGROUND

Planetary gear trains are complex mechanisms that reduce, or occasionally increase, the rotational speed between two rotating shafts or rotors. The compactness of planetary gear trains makes them appealing for use in aircraft engines where space is at a premium.

The forces and torque transferred through a planetary gear train place stresses on the gear train components that may make them susceptible to breakage and wear. In practice, conditions may be less than ideal and place additional stresses on the gear components. For example the longitudinal axes of a planetary gear train's sun gear, planet carrier, and ring gear are ideally coaxial with the longitudinal axis of an external shaft that rotates the sun gear. Such perfect coaxial alignment, however, is rare due to numerous factors including imbalances in rotating hardware, manufacturing imperfections, and transient flexure of shafts and support frames due to aircraft maneuvers. The resulting parallel and angular misalignments impose moments and forces on the gear teeth, the bearings which support the planet gears in their carrier, and the carrier itself. These imposed forces and moments may cause gear component wear and increase a likelihood that a component may break in service. Component breakage is undesirable in any application, but particularly so in an aircraft engine. Moreover, component wear necessitates inspections and part replacements which may render the engine and aircraft uneconomical to operate.

The risk of component breakage may be reduced by making the gear train components larger and therefore stronger. Increased size may also reduce wear by distributing the transmitted forces over correspondingly larger surfaces. However increased size offsets the compactness that makes planetary gear trains appealing for use in aircraft engines, and the corresponding weight increase is similarly undesirable. The use of high strength materials and wear resistant coatings can also be beneficial, but escalates the cost of the gear train and therefore does not diminish the desire to reduce wear.

Stresses due to misalignments can also be reduced by the use of flexible couplings to connect the gear train to external devices such as rotating shafts or non-rotating supports. For example, a flexible coupling connecting a sun gear to a drive shaft flexes so that the sun gear remains near its ideal orientation with respect to the mating planet gears even though the axis of the shaft is oblique or displaced with respect to a perfectly aligned orientation. Many prior art couplings, however, contain multiple parts that require lubrication and are themselves susceptible to wear. Prior art couplings may also lack adequate rigidity and strength, with respect to torsion about a longitudinal axis, to be useful in high torque applications.

SUMMARY

In an embodiment of the present disclosure, a gas turbine engine includes a fan, a first compressor stage and a second compressor stage, a first turbine stage and a second turbine stage, and wherein said first turbine stage drives said second compressor stage as a high spool, and wherein said second turbine stage drives said first compressor stage as part of a low spool, and a gear train driving said fan with said low spool, and such that said fan and said first compressor stage rotate in the same direction, and wherein said high spool operates at higher pressures than said low spool.

In another embodiment according to any of the previous embodiments, said gear train has a planetary gear, a sun gear, a stationary ring gear, a carrier in which said planetary gear is mounted, and said carrier mounted for rotation about said sun gear and driving said fan.

In another embodiment according to any of the previous embodiments, a lubricating system is provided for said gear train.

In another embodiment according to any of the previous embodiments, the lubricating system includes a lubricant input, there being a stationary first bearing receiving lubricant from said lubricant input, said first bearing having an inner first race in which lubricant flows, and a second bearing for rotation within said first bearing, said second bearing having a first opening in registration with said inner first race such that lubricant may flow from said inner first race through said first opening into a first conduit.

In another embodiment according to any of the previous embodiments, the gas turbine engine further comprises a rotating carrier for supporting a planetary gear wherein said second bearing extends from said rotating carrier about an axis.

In another embodiment according to any of the previous embodiments, wherein said first conduit lubricates said planetary gears.

In another embodiment according to any of the previous embodiments, the gas turbine engine further comprises a first spray bar disposed on said carrier.

In another embodiment according to any of the previous embodiments, said ring gear has a recess.

In another embodiment according to any of the previous embodiments, the said recess is radially outward of gear teeth on said ring gear.

In another embodiment according to any of the previous embodiments, the said recess is formed by recess portions formed in each of two gear portions which together form said ring gear.

In another embodiment according to any of the previous embodiments, the fan rotates slower than the first compressor stage.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION

Figure 1:
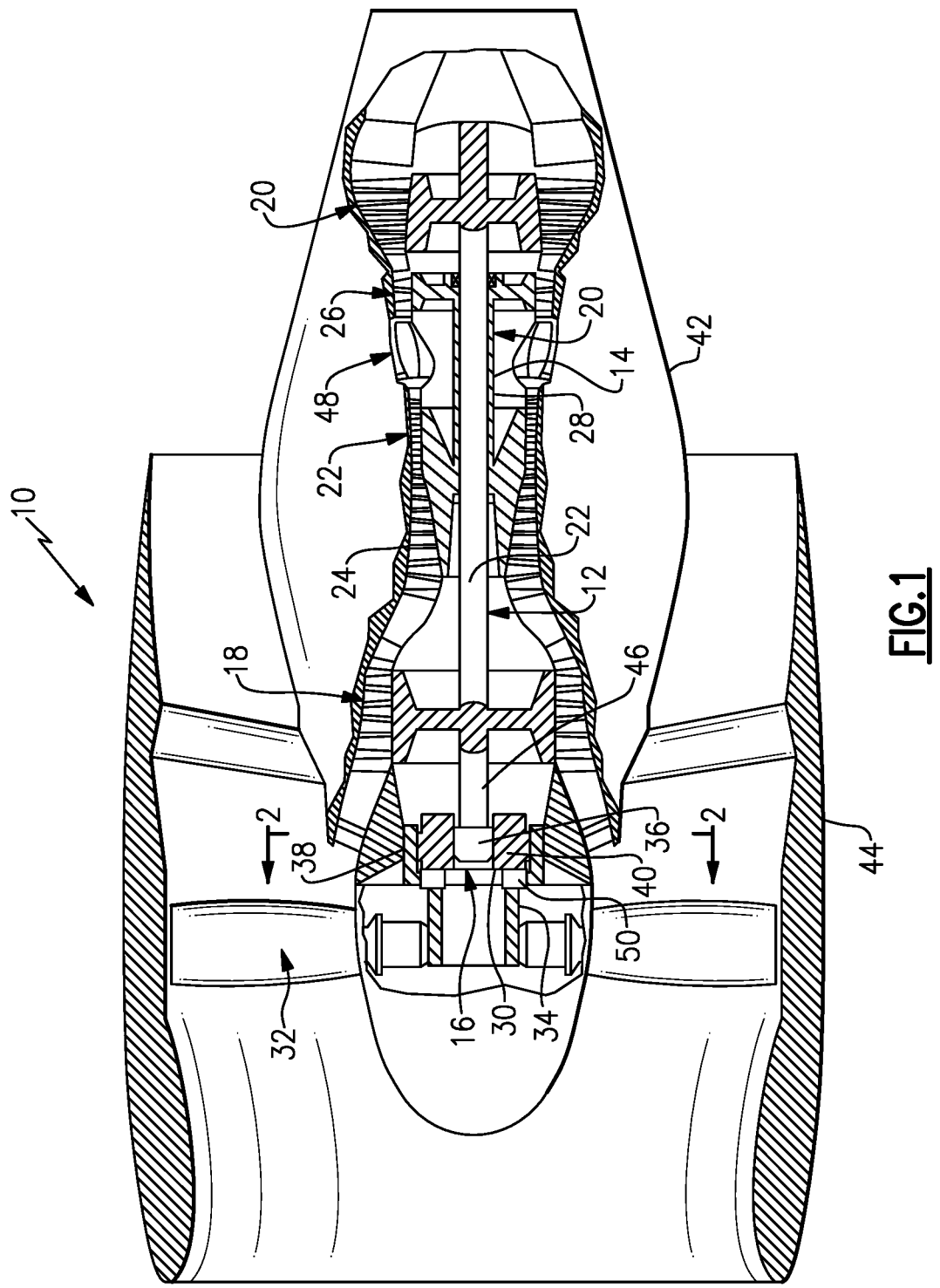
FIG. 1 is a schematic view, partially in section, of a gas turbine engine.

FIG. 1 shows a schematic cross-section of gas turbine engine 10. Gas turbine engine 10 includes low pressure spool 12, high pressure spool 14 and fan drive gear system ("FDGS") 16. Low pressure spool 12 includes low pressure compressor 18 and low pressure turbine 20, which are connected by low pressure shaft 22. High pressure spool 14 includes high pressure compressor 24 and high pressure turbine 26, which are connected by high pressure shaft 28. Fan drive gear system 16 includes epicyclic gear train 30 that drives a fan assembly 32 by way of a carrier shaft 34. Epicyclic gear train 30 includes sun gear 36, ring gear 38 and planetary gears 40 as will be shown hereinbelow. A carrier 50 is shown schematically in FIG. 4 between shaft 34 and ring gear 38. Details of this connection are better shown in FIG. 2.

Low pressure spool 12 and high pressure spool 14 are covered by engine nacelle 42, and fan assembly 32 and nacelle 42 are covered by fan nacelle 44. Low pressure spool 12, high pressure spool 14 and fan assembly 32 comprise a two-and-a-half spool gas turbine engine in which epicyclic gear train 30 couples fan assembly 32 to low pressure spool 12 with input shaft 46.

Fan assembly 32 generates bypass air for producing thrust that is directed between engine nacelle 42 and fan nacelle 44, and core air that is directed into engine nacelle 42 for sequential compression with low pressure compressor 18 and high pressure compressor 24. Compressed core air is routed to combustor 48 wherein it is mixed with fuel to sustain a combustion process. High energy gases generated in combustor 48 are used to turn high pressure turbine 26 and low pressure turbine 20. High pressure turbine 26 and low pressure turbine 20 rotate high pressure shaft 28 and low pressure shaft 22 to drive high pressure compressor 24 and low pressure compressor 18, respectively. Low pressure shaft 22 also drives input shaft 46, which connects to epicyclic gear train 30 to drive fan assembly 32.

Figure 2A:
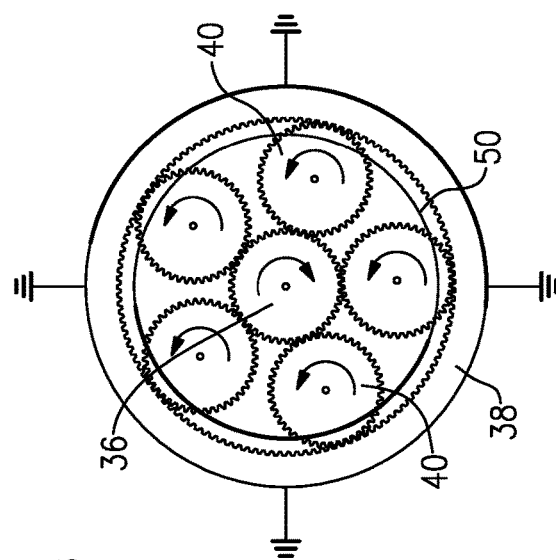
FIG. 2A is a sectional view through the gear drive.
Figure 2:
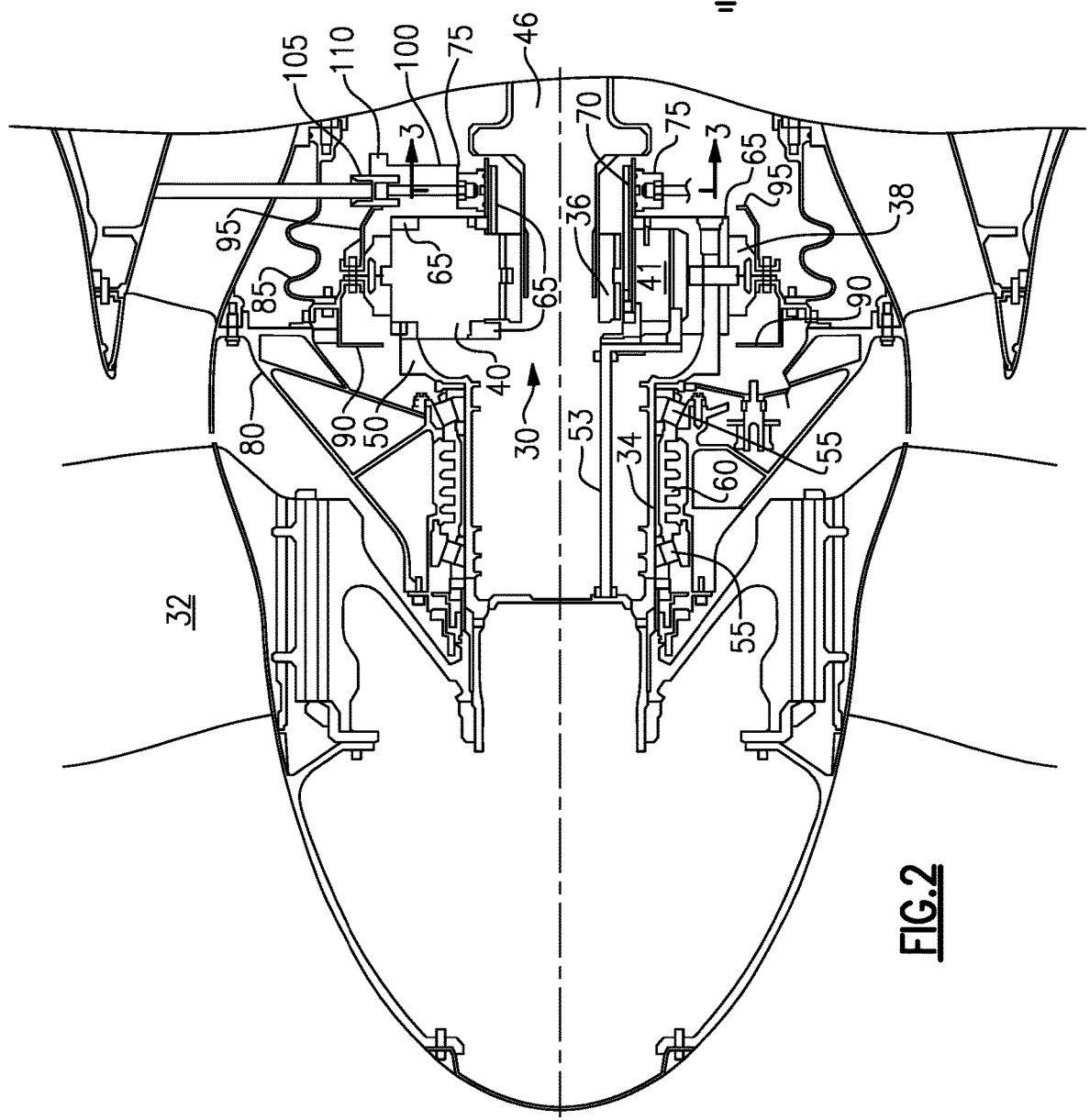
FIG. 2 is a sectional view taken along the lines 2-2 in FIG. 1.

Referring now to FIG. 2 and FIG. 2A, a view of the planetary gear system having exemplary oil supply system is shown. The system is comprised of a input shaft 46, sun gear 36 attaching thereto a plurality of planetary gears 40 that rotate about the sun gear 36, stationary ring gear 38, and a carrier 50 that rotates about the star gear to drive the fan assembly 32. As the ring gear 38 is stationary, the rotation of the sun gear 36 causes each planetary gear 40 to counter-rotate relative to the direction of rotation of the sun gear 36 and simultaneously to orbit the sun gear 36 in the direction of the sun gear's rotation. In other words, whereas each planetary gear 40 individually counter-rotates relative to the sun gear 36, the group of planetary gears 40 co-rotates with the sun gear 36. Moreover, as the carrier 50 is driven by the rotation of the group of planetary gears 40, the carrier 50 also co-rotates with respect to the sun gear 36. Finally, as the fan 32 is driven by the carrier 50 (via shaft 34), the fan 32 also co-rotates with respect to the sun gear 36 and the low spool shaft 46. Thus, in this embodiment, the fan 32 rotates in the same direction as the low pressure compressor 18.

A first spray bar 41 is mounted to the carrier 50 in between each planetary gear 40 that lubricates the planet gears 40 and ring gear 38. A second spray bar 53 is attached to the first spray bar 41 and extends forward to provide lubrication to the carrier shaft 34 that is supported by tapered bearings 55 that are tensioned by spring 60.

The carrier 50 has a shaft 34 for driving the fan assembly 32, a circular body 65 for holding the planetary gears 40 and a cylinder 70 projecting aft about the input shaft 46. The cylinder 70 also closely interacts with a stationary oil transfer bearing 75.

A grounding structure 80 holds the FDGS 16, the ring gear 38, forward gutter 90 and aft gutter 95. The flexible coupling 85 is disposed around the rotary input shaft 46. The forward gutter 90 and an aft gutter 95 attach to and around the outer edge of the ring gear 38 to collect oil used by the system for reuse as will be discussed herein. Oil is input through the stationary oil transfer bearing 75 to the cylinder 70 (e.g. also a bearing) as will be discussed herein.

Figure 3:
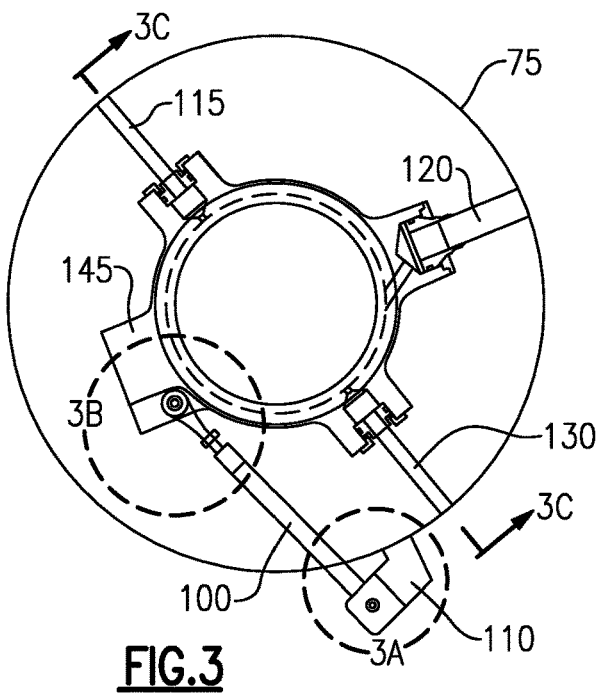
FIG. 3 is a sectional view taken along the lines 3-3.

Referring now to FIG. 3, a side, sectional view of the oil transfer bearing 75 is shown. The oil transfer bearing 75 is prevented from rotational movement by attachment of a link 100 via tab 110 to an oil input coupling 105 that attaches to the stationary aft gutter 95 (see also FIG. 2).

The oil transfer bearing 75 has a plurality of inputs to provide oil to those portions of the FDGS 16 that require lubrication during operation. For instance, oil from tube 115 is intended to lubricate the tapered bearings 55, oil from tube 120 is intended to lubricate the planet gear bearings 125 (see FIG. 5), and oil from tube 130 is intended to lubricate the planet and ring gears, 38, 40. Though three inputs are shown herein, other numbers of oil inputs are contemplated herein.

Figure 3A:
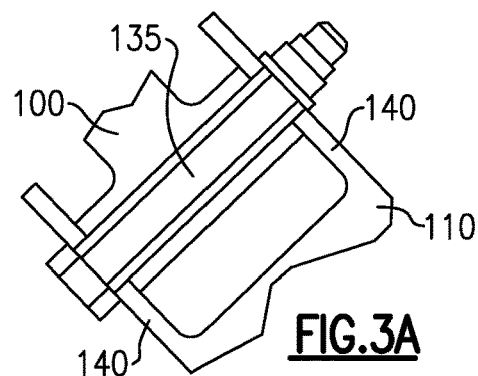
FIG. 3A is a sectional view taken along the line A-A of FIG. 3.
Figure 3B:
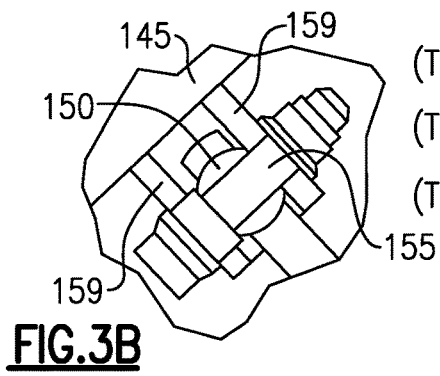
FIG. 3B is a sectional view taken along the line B-B of FIG. 3.

Referring now to FIGS. 3A and 3B, the link 100 attaches via a pin 135 to the ears 140 extending from the tab 110. The link 100 extends towards a boss 145 on the oil transfer bearing 75 and is attached thereto by a ball 150 and a pin 155 extending through the ball and a pair of ears 159 on the boss 145 on the oil transfer bearing 75. The ball 150 allows the oil transfer bearing 75 to flex with the rotary input shaft 46 as torqueing moments are experienced by the fan assembly 32 and other portions of the engine 10. The link 100 prevents the oil transfer bearing 75 from rotating while allowing it to flex.

Figure 3C:
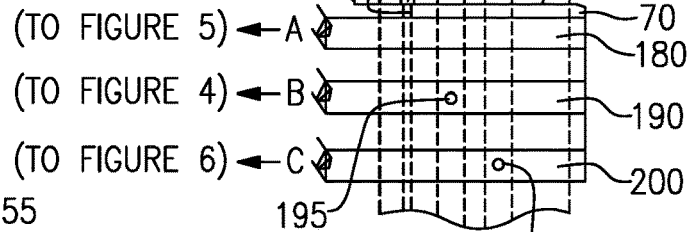
FIG. 3C is a sectional view taken along the line C-C FIG. 3.

Referring now to FIG. 3C, a cross-sectional view of the oil transfer bearing 75 is shown. The oil transfer bearing has a first race 160 that has a rectangular shape and extends around the interior surface 165 of the oil transfer bearing 75, a second race 170 that has a rectangular shape and extends around the interior surface 165 of the oil transfer bearing 75 and a third race 175 that has a rectangular shape and extends around the interior surface 165 of the oil transfer bearing 75. In the embodiment shown, tube 120 inputs oil via conduit 180 into the first race 160.

Cylinder 70 which extends from the carrier circular body 65, has a first oil conduit 180 extending axially therein and communicating with the first race 160 via opening 185, a second oil conduit 190 extending axially therein and communicating with the second race 170 via opening 195 and a third oil conduit 200 extending axially therein and communicating with the third race 175 via opening 205. As the cylinder 70 rotates within the oil transfer bearing 75, the openings 185, 195, 205 are constantly in alignment with races 160, 170, 175 respectively so that oil may flow across a rotating gap between the oil transfer bearing 75 and the cylinder 65 through the openings 185, 195, 205 to the conduits 180, 190, 200 to provide lubrication to the areas necessary in engine 10. As will be discussed herein, oil from conduit 180 flows through pathway A, oil from conduit 190 flows through pathway B and oil from conduit 200 flows through pathway C as will be shown herein.

Figure 4:
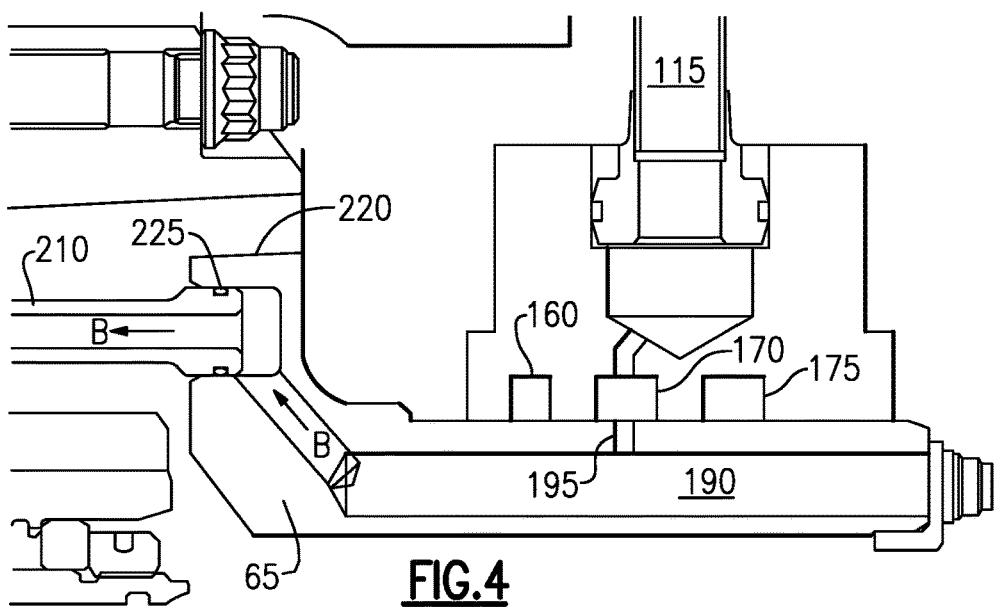
FIG. 4 is a sectional view of a portion of oil flow path A.
Figure 6:
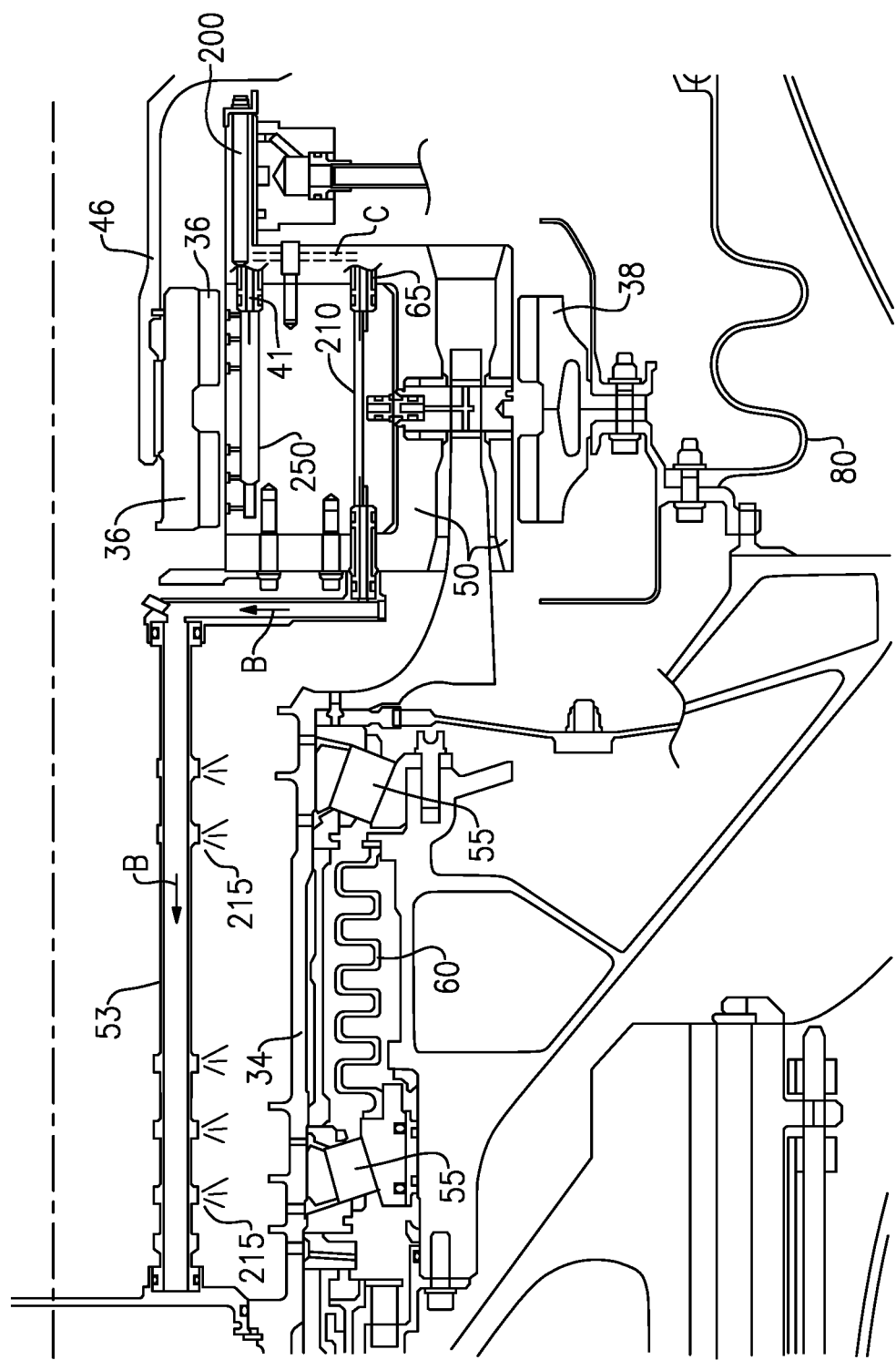
FIG. 6 is a sectional view of a lower portion of the planetary gear system of FIG. 1.

Referring now to FIGS. 4 and 6, oil from the tube 115 flows into second race 170, through opening 195 into conduit 190. From conduit 190, the oil flows through path B into a pipe 210 in the first spray bar 41 to the second spray bar 53 where it is dispersed through nozzles 215. Pipe 210 is mounted into fixtures 220 in the circular body 65 by o-rings 225 the oil FIG. 4, the journal oil bearing input passes through tube, and tube into transfers tubes through tube into the interior of each planetary gear. Each planetary gear has a pair of transverse tubes communicating with the interior of the planetary journal bearing to distribute oil between the planetary gear and the ring gear and a set of gears to provide lubricating area oil to the journal bearings 235 themselves.

Figure 5:
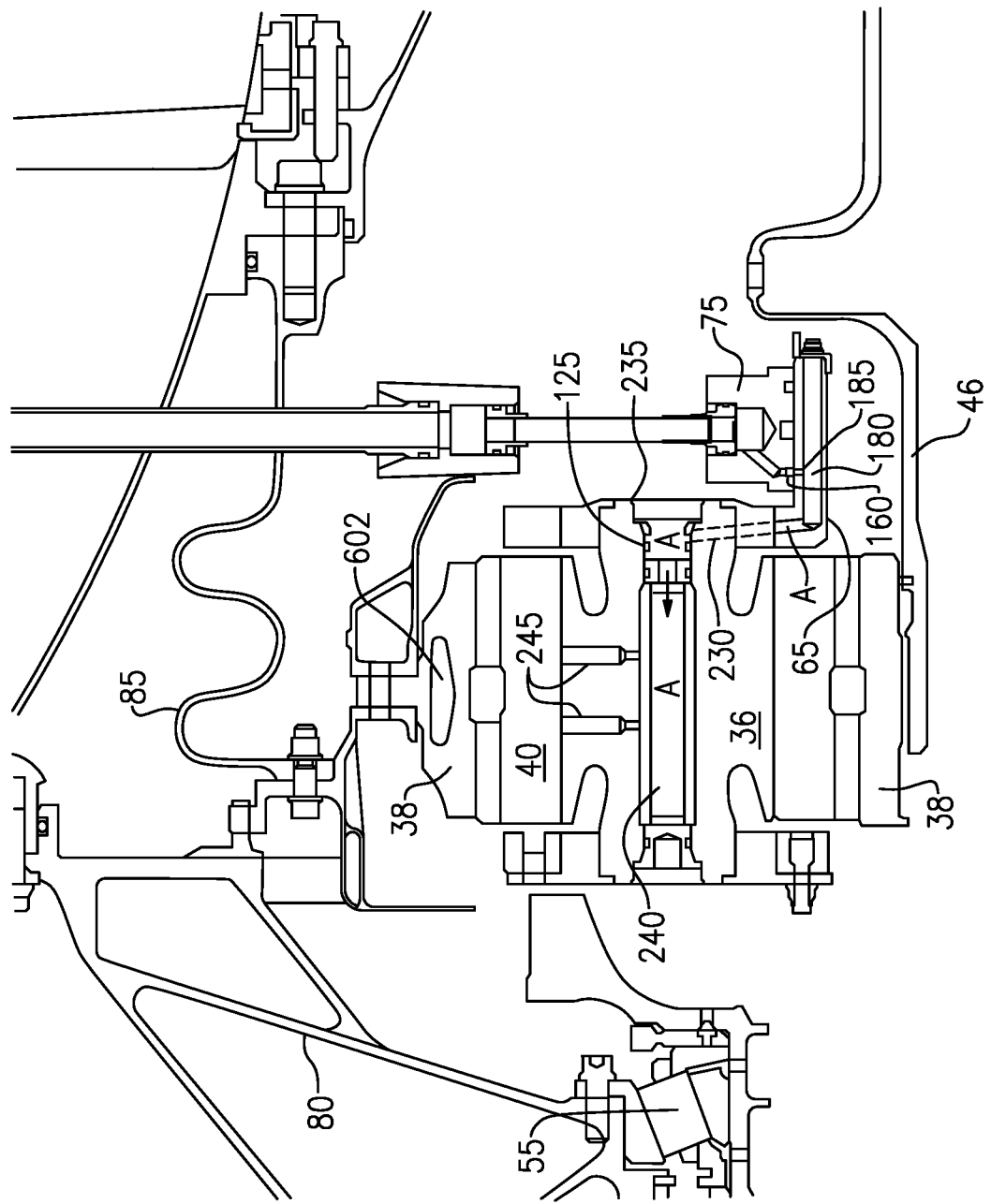
FIG. 5 is a sectional view of an upper portion of the planetary gear system of FIG. 1.

Referring now to FIGS. 3C and 5, the flow of oil through path A is shown. The oil leaves conduit 180 through tube 230 and flows around journal bearings 235 that support the planet gear 40 and into the interior of shaft 240. Oil then escapes from the shaft 240 through openings 245 to lubricate between the planetary gears 40 and the ring gear 38.

Referring to FIG. 6, the conduit 200 provides oil through pathway C into manifold 250 in the first spray bar 41 which sprays oil through nozzles 255 on the sun gear.

Figure 7:
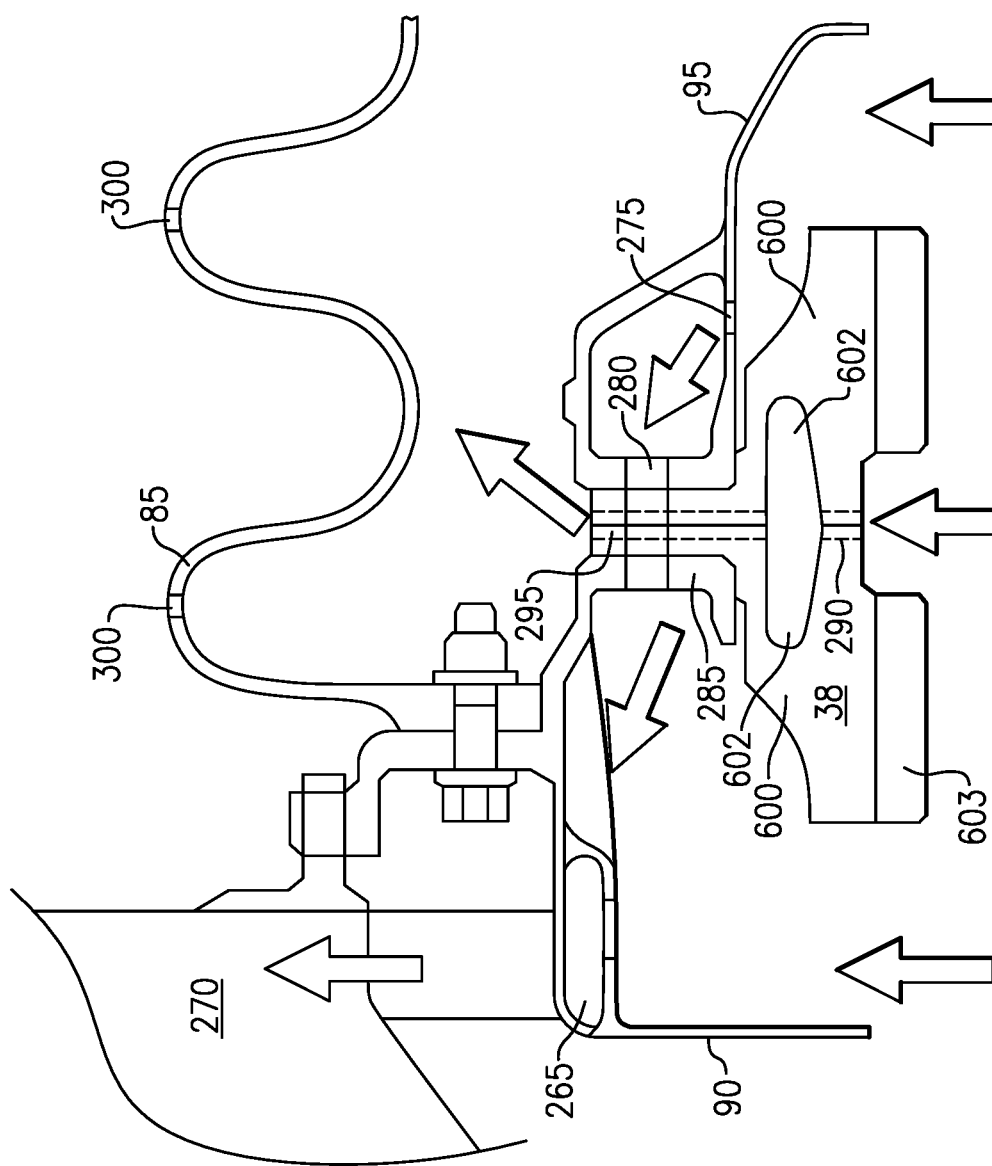
FIG. 7 is a sectional view of a flow of oil into gutters.

Referring now to FIG. 7, oil drips (see arrows) from the planetary gears 40 and the sun gear 36 about the carrier 50 and is trapped by the forward gutter 90 and the aft gutter 95. Oil captured by the forward gutter 90 is collected through scupper 265 for transport into an auxiliary oil tank 270. Similarly, oil captured by the aft gutter 95 travels through opening 275 and opening 280 in the ring gear support 285 into the forward gutter 90 to be similarly collected by the scupper 265 to go to the auxiliary oil tank 270. Some oil passes through openings 290, 295 within the ring gear 38 and drips upon the flexible coupling 85 and migrates through holes 300 therein and drains to the main scavenge area (not shown) for the engine 10.

As is clear from FIGS. 5 and 7, there is a recess adjacent the outer periphery of the ring gear 38. The recess identified by 602, can be seen to be formed by half-recess portions in each of two separate gear portions 600 which form the ring gear 38. As is clear, the recess 602 is radially outwardly of the gear teeth 603 on the ring gear 38. This recess helps balance force transmitted through the ring gear as the various interacting gear members shift orientation relative to each other.

Referring now to the Figures, In view of these shortcomings a simple, reliable, unlubricated coupling system for connecting components of an epicyclic gear train 30 to external devices while accommodating misalignment therebetween is sought.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gas turbine engine comprising:
a fan section,
a first compressor stage and a second compressor stage;
a first turbine stage and a second turbine stage, wherein said first turbine stage drives said second compressor stage as a high spool, and wherein said second turbine stage drives said first compressor stage as a low spool;
a planetary gear train having at least one planetary gear, a sun gear, a ring gear fixed from rotation relative to an engine static structure, a ring gear support, a carrier supporting said at least one planetary gear, said carrier driving said fan section, wherein said ring gear has a recess configured to balance force transmitted through the ring gear and wherein the ring gear has at least one ring gear opening therethrough and said ring gear support including a ring gear support opening through the ring gear and the ring gear support that is perpendicular to the at least one ring gear opening;
a lubricating system for said planetary gear train, wherein said at least one ring gear opening and said ring gear support opening is in fluid communication with said lubricating system; and
an aft gutter aft of said ring gear and a forward gutter forward of said ring gear, the aft and forward gutters configured to collect lubricant from the lubricating system, and wherein the ring gear support opening is defined between a forward end and an aft end, and wherein the aft end is configured to receive the lubricant from the aft gutter and the forward end is configured to pass the lubricant to the forward gutter;
wherein said low spool drives said fan section via said planetary gear train.

2. The gas turbine engine of claim 1, wherein said carrier and said sun gear rotate in the same direction.

3. The gas turbine engine of claim 2, wherein said carrier drives said fan, and said fan and said first compressor stage rotate in the same direction.

4. The gas turbine engine of claim 3, wherein said recess is radially outward of gear teeth on said ring gear.

5. The gas turbine engine of claim 4, wherein said ring gear comprises a first gear portion with a first set of teeth and a second gear portion with a second set of teeth, and wherein said recess comprises a first half-recess in the first gear portion and a second half-recess in said second gear portion.

6. The gas turbine engine of claim 5, wherein said force is caused by members of said planetary gear train shifting orientation relative to one another.

7. The gas turbine engine of claim 6, wherein said lubricating system includes a lubricant input, there being a stationary first bearing receiving lubricant from said lubricant input, said first bearing having an inner first race in which lubricant flows, and a second bearing for rotation within said first bearing, said second bearing having a first opening in registration with said inner first race such that lubricant may flow from said inner first race through said first opening into a first conduit.

8. The gas turbine engine of claim 7, wherein said first conduit provides lubricant to said at least one planetary gear.

9. The gas turbine engine of claim 8, wherein said lubricant passes from said planetary gear to said at least one opening.

10. The gas turbine engine of claim 9, wherein said low spool includes a shaft, and further comprising a flexible coupling disposed about said shaft, wherein said at least one opening is configured to allow lubricant to pass from the at least one opening said flexible coupling.

11. The gas turbine engine of claim 10, wherein said at least one ring gear opening includes a first opening radially inward from said recess, and a second opening radially outward from said recess.

12. The gas turbine engine of claim 7, wherein said first bearing further comprises a stationary second race into which lubricant flows, and said second bearing having a second opening in registration with said second race such that lubricant flows from said second race through said second opening into a second conduit.

13. The gas turbine engine of claim 12, wherein said second conduit passes lubricant to a component of the gas turbine engine.

14. The gas turbine engine of claim 12, wherein said first conduit passes lubricant to a first part of the gas turbine engine and said second conduit passes lubricant to a second part of the gas turbine engine different from the first part of the gas turbine engine.

15. The gas turbine engine of claim 14, wherein said second conduit passes lubricant to a spray bar, wherein said spray bar is disposed on said carrier and provides lubricant to said at least one planetary gear and to said ring gear.

16. The gas turbine engine of claim 15, wherein said first bearing has a third inner race and said second bearing has a third opening in registration with said third inner race and a third conduit for passing lubricant through said first spray bar.

17. The gas turbine engine of claim 15, further comprising a second spray bar extending from the first spray bar.

18. The gas turbine engine of claim 17, wherein said second spray bar provides lubricant to said low spool.

19. The gas turbine engine of claim 14, wherein said ring gear comprises a first gear portion with a first set of teeth and a second gear portion with a second set of teeth, and wherein said recess comprises a first half-recess radially outward of gear teeth in the first gear portion and a second half-recess radially outward of gear teeth in said second gear portion.

20. The gas turbine engine of claim 19, wherein said force is caused by members of said planetary gear train shifting orientation relative to one another.

21. The gas turbine engine of claim 1, wherein said at least one ring gear opening includes a first opening radially inward from said recess, and a second opening radially outward from said recess.

22. The gas turbine engine of claim 21, wherein said first and second openings extend in a direction that is perpendicular to an axis of the gas turbine engine.

23. The gas turbine engine of claim 1, wherein said ring gear support opening is configured to allow lubricant to pass from said aft gutter to said forward gutter.

24. The gas turbine engine of claim 23, further comprising a scupper configured to collect lubricant from said forward gutter.

* * * * *